(12) United States Patent
Walton et al.

(10) Patent No.: US 10,858,107 B2
(45) Date of Patent: Dec. 8, 2020

(54) OVERHEAD STOWAGE BIN ASSEMBLY FOR A VEHICLE

(71) Applicant: THE BOEING COMPANY, Chicago, IL (US)

(72) Inventors: Brent Clarence Walton, Seattle, WA (US); William F. Herold, Everett, WA (US); Hung Quang Nguyen, Seattle, WA (US); Kevin Duane Bass, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 337 days.

(21) Appl. No.: 15/652,433

(22) Filed: Jul. 18, 2017

(65) Prior Publication Data
US 2017/0313424 A1    Nov. 2, 2017

Related U.S. Application Data

(63) Continuation of application No. 14/682,217, filed on Apr. 9, 2015, now Pat. No. 9,738,386.

(51) Int. Cl.
*B64D 11/00*      (2006.01)
*B64F 5/10*      (2017.01)

(52) U.S. Cl.
CPC .......... *B64D 11/003* (2013.01); *B64F 5/10* (2017.01)

(58) Field of Classification Search
CPC ..... B64D 11/008; B64D 11/00; B64F 5/0009; B64F 5/10; B60R 5/003
See application file for complete search history.

(56) References Cited

U.S. PATENT DOCUMENTS

| | | | | |
|---|---|---|---|---|
| 5,716,027 A | * | 2/1998 | Hart .................... | B64D 11/003 244/118.1 |
| 6,164,477 A | * | 12/2000 | Druckman ............. | A47B 43/02 220/6 |
| 7,258,406 B2 | * | 8/2007 | Stephan ................. | B60R 5/003 244/118.5 |

(Continued)

FOREIGN PATENT DOCUMENTS

CN    1468779    2/2004
EP    1216920    6/2002

(Continued)

OTHER PUBLICATIONS

Extended European Search Report for EP 16160258.6-1754, dated Jul. 19, 2016.

(Continued)

*Primary Examiner* — Assres H Woldemaryam
(74) *Attorney, Agent, or Firm* — The Small Patent Law Group LLC; Joseph M. Butscher

(57) ABSTRACT

A stowage bin assembly is configured to be positioned above at least a portion of one or more seats within a vehicle. The stowage bin assembly may include a pivot bin including a forward end panel, an aft end panel that is opposed to the forward end panel, a front panel extending between the forward and aft end panels, and a closeout bracket secured to the forward end panel, the aft end panel, and the front panel. A baggage retaining chamber is defined between the forward end panel, the aft end panel, and the front panel. The closeout bracket spans between the forward end panel and the aft end panel.

20 Claims, 9 Drawing Sheets

(56) References Cited

U.S. PATENT DOCUMENTS

| | | | |
|---|---|---|---|
| 8,262,022 B2* | 9/2012 | Young | B64D 11/003 244/118.1 |
| 8,919,695 B2* | 12/2014 | Bock | B64D 11/003 244/118.5 |
| 9,090,351 B1* | 7/2015 | Frazier | B64D 11/003 |
| 2002/0074913 A1 | 6/2002 | Lau | |
| 2006/0021405 A1 | 2/2006 | Wang et al. | |
| 2006/0023401 A1 | 2/2006 | Naito et al. | |
| 2006/0023758 A1 | 2/2006 | Wang et al. | |
| 2006/0214055 A1* | 9/2006 | Novak | B64D 11/003 244/118.5 |
| 2006/0234010 A1* | 10/2006 | Wirrick | B29C 43/146 428/174 |
| 2006/0237585 A1* | 10/2006 | Lau | B64D 11/00 244/118.5 |
| 2007/0095981 A1* | 5/2007 | Bock | B64D 11/003 244/118.1 |
| 2008/0005583 A1 | 1/2008 | Shen | |
| 2008/0055836 A1* | 3/2008 | Lamoree | B64D 11/003 361/837 |
| 2009/0012108 A1 | 1/2009 | Guillemont et al. | |
| 2009/0025055 A1 | 1/2009 | White et al. | |
| 2009/0121080 A1* | 5/2009 | Feldkirchner | B64D 11/003 244/118.5 |
| 2009/0250553 A1* | 10/2009 | Bock | B61D 37/003 244/118.5 |
| 2011/0000100 A1 | 1/2011 | Malcher et al. | |
| 2011/0001009 A1* | 1/2011 | Reece | B64C 1/066 244/121 |
| 2011/0139929 A1* | 6/2011 | Young | B64D 11/003 244/118.5 |
| 2011/0186681 A1 | 8/2011 | Vine | |
| 2013/0206903 A1 | 8/2013 | Savian | |
| 2013/0233971 A1 | 9/2013 | Burrows | |
| 2014/0197723 A1* | 7/2014 | Herold | B64D 11/003 312/327 |
| 2014/0246968 A1 | 8/2014 | Geng | |
| 2015/0166178 A1* | 6/2015 | Savian | B64D 11/00 244/118.6 |
| 2015/0307192 A1* | 10/2015 | Savian | B64D 11/0015 244/118.5 |

FOREIGN PATENT DOCUMENTS

| | | |
|---|---|---|
| JP | 2002-211497 | 7/2002 |
| RU | 2300485 | 6/2007 |

OTHER PUBLICATIONS

First Notification of Office Action for CN App No. 201610212647, dated Mar. 26, 2020 (and English translation).
Notice of Reasons for Rejection for JP App No. 2016-026649, dated Feb. 10, 2020, and English translation.
Notification of results of patentability examination of the invention for RU 2016104646/12(007354), dated May 21, 2019 (including English translation).

* cited by examiner

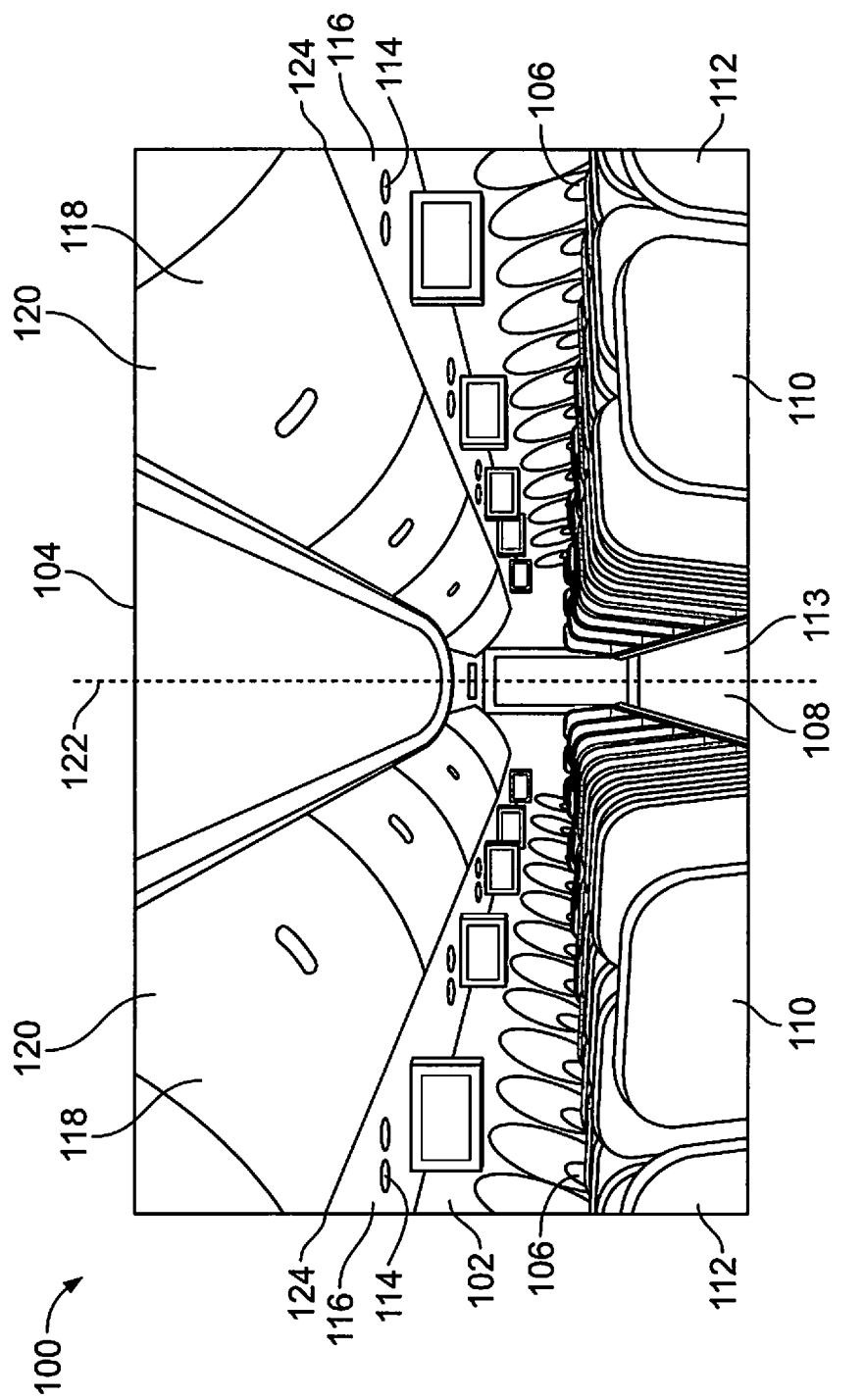

OVERHEAD STOWAGE BIN ASSEMBLY FOR A VEHICLE

RELATED APPLICATIONS

This application is a continuation of U.S. patent application Ser. No. 14/682,217, entitled "Overhead Stowage Bin Assembly for a Vehicle," filed Apr. 9, 2015, now U.S. Pat. No. 9,738,386, which is hereby incorporated by reference in its entirety.

FIELD OF EMBODIMENTS OF THE DISCLOSURE

Embodiments of the present disclosure generally relate to stowage bin assemblies within vehicles.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Overhead stowage bins are typically positioned above rows of seats within a commercial aircraft. Each overhead stowage bin is configured to be moved between an open position and a closed position. In the open position, passengers may place carry-on luggage within a moveable bin or bucket. Before the aircraft leaves a terminal, flight attendants ensure that each stowage bin is securely closed.

Due to time constraints, security requirements, and airline policies regarding checked luggage, many passengers decide to carry baggage and personal items onto an aircraft. As such, carry-on baggage has increased in size and often includes large, rectangular rigid bags. Larger capacity stowage bins have been, and continue to be, employed by carriers to accommodate the increase in carry-on baggage.

Often, however, there are not enough stowage bins on an aircraft to accommodate all of the carry-on baggage of a particular flight. For example, as passengers board a plane, the total amount of available overhead bin space decreases. Passengers who board later may be unable to stow their baggage due to the limited amount of available space. Further, many carry-on bags are simply too large to fit within stowage bins of particular aircraft. For example, smaller aircraft may include smaller stowage bins that are unable to accommodate carry-on baggage that exceeds a particular size.

Accordingly, a need exists for a stowage bin that is able to accommodate an increased amount of carry-on baggage. Further, a need exists for a stowage bin that is able to accommodate larger carry-on baggage.

SUMMARY OF THE DISCLOSURE

Certain embodiments of the present disclosure provide a stowage bin assembly configured to be positioned above at least a portion of one or more seats within a vehicle, such as a commercial aircraft. The stowage bin assembly may include a pivot bin including a forward end panel, an aft end panel that is opposed to the forward end panel, a front panel extending between the forward and aft end panels, and a closeout bracket secured to the forward end panel, the aft end panel, and the front panel. A baggage retaining chamber is defined between the forward end panel, the aft end panel, and the front panel. The closeout bracket spans between the forward end panel and the aft end panel. The stowage bin assembly may also include or otherwise be connected to a strongback. The pivot bin may be pivotally secured to the strongback. The pivot bin is configured to be pivoted between open and closed positions. The closeout bracket may be secured to a bottom end of the front panel, such as a bottom portion of a bottom panel connected to, or part of, the front panel.

The stowage bin assembly may be devoid of an upper panel. In at least one embodiment, no portion of any panel extends past the closeout bracket between the forward and aft end panels.

Each of the forward end panel, the aft end panel, and the front panel may be formed of composite honeycomb sandwich panels. The closeout bracket may be formed from a unitary piece of metal, such as sheet metal, aluminum, or the like.

The baggage retaining chamber may be configured to support standard sized roller bags in a vertically-oriented position in open and closed positions. An interior surface of the front panel is configured to support sides of the standard sized roller bags in the open and closed positions.

A standard sized roller bag may have dimensions of 22"×14"×9", for example. A stowage bin assembly according to an embodiment of the present disclosure may be configured to contain six of such standard sized roller bags in an upright, on-side orientation.

The closeout bracket may include a closeout flange that is configured to be spaced apart from a strongback through an entire range of motion of the pivot bin with respect to the strongback. The closeout flange may include an upturned edge of a longitudinal main body. In at least one embodiment, the closeout bracket may include a main body having a first portion connected to a second portion through an intermediate curved portion. The main body may be configured to cradle lower curved corner portions of the forward and aft end panels. The closeout bracket may also include one or more securing tabs extending perpendicularly from one or both of the first and second portions. Each of the securing tab(s) may include a through-hole configured to receive a fastener that secures the closeout bracket to one or more of the front panel, the forward end panel, or the aft end panel.

Certain embodiments of the present disclosure provide a method of forming a pivot bin of a stowage bin assembly that is configured to be positioned above at least a portion of one or more seats within a vehicle. The method may include separately forming a forward end panel, an aft end panel, and a front panel, aligning the forward end panel, the aft end panel, and the front panel with respect to a closeout bracket, and securing the forward end panel, the aft end panel, and the front panel to the closeout bracket.

The aligning operation may include using the closeout bracket as an assembly jig or other such alignment guide for the forward end panel, the aft end panel, and the front panel. The securing operation may include one or both of adhesively securing the forward end panel, the aft end panel, and the front panel to the closeout bracket or using one or more fasteners to secure the forward end panel, the aft end panel, and the front panel to the closeout bracket.

The method may also include upturning an edge of the closeout bracket to form a closeout flange.

The method may refrain from securing an upper panel to any of the forward end panel, the aft end panel, and the front panel. The method may also refrain from folding any panel portions to form any of the forward end panel, the aft end panel, and the front panel.

The separately forming operation may include forming the front panel with a different thickness than the forward and aft end panels.

BRIEF DESCRIPTION OF THE DRAWINGS

FIG. 3 illustrates a perspective interior view of an internal cabin of an aircraft, according to an embodiment of the present disclosure.

DETAILED DESCRIPTION OF THE DISCLOSURE

Figure 1:
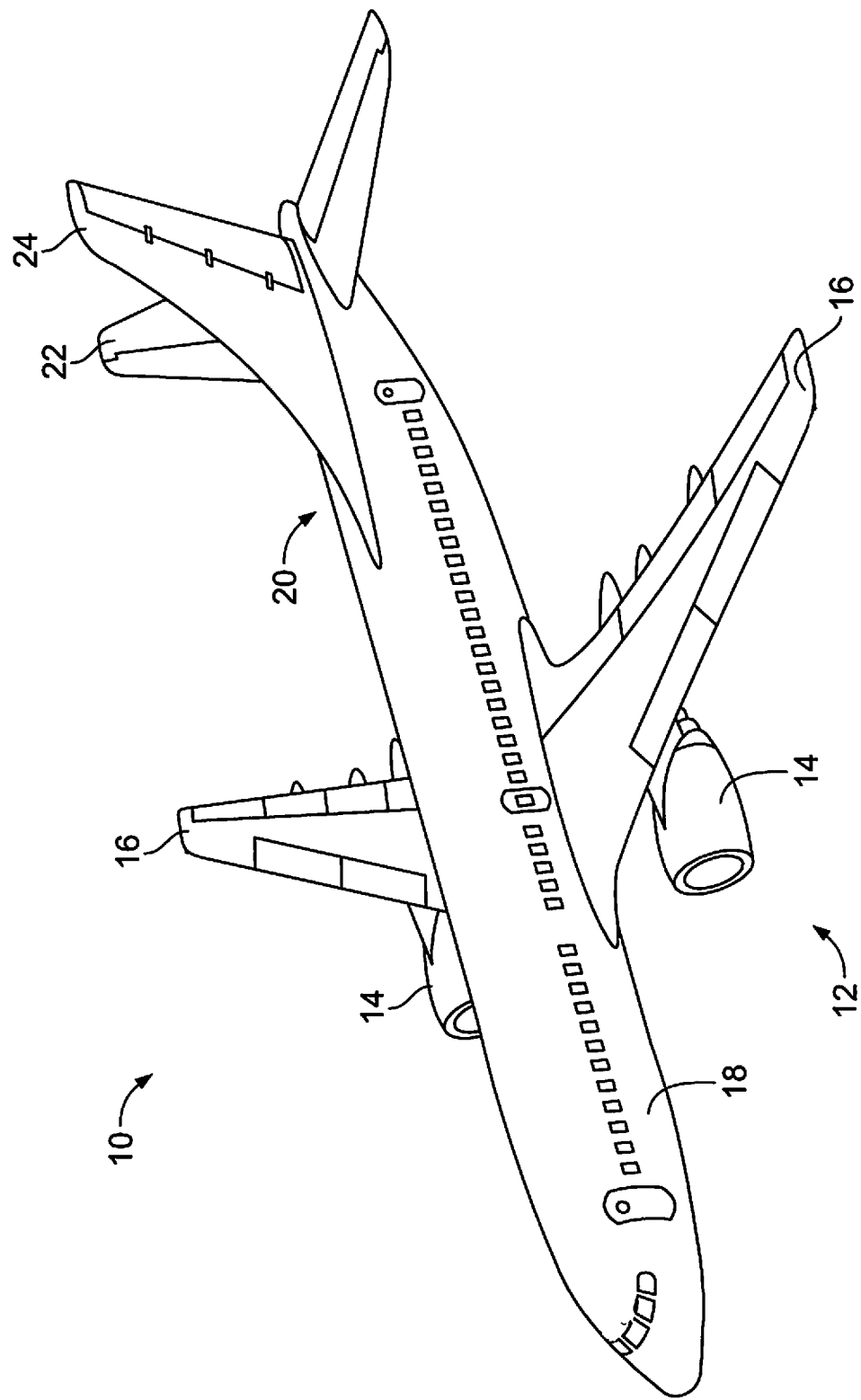
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a stowage bin assembly that is configured for use with a vehicle, such as a commercial aircraft. For example, embodiments of the present disclosure may be used with a Boeing 737 aircraft. The stowage bin assembly is configured to accommodate six standard sized roller bags in a vertical orientation (for example, propped up on a side), in a bin having a length of 60". It has been found that embodiments of the present disclosure increase overall overhead baggage count within a Boeing 737-800, for example, from 118 bags to 174 bags. The stowage bin assemblies offer passengers and crew more room and flexibility for loading bags, and increases the opportunity for all passengers to be able to find a suitable place for their bag within an internal cabin of a vehicle, such as a commercial aircraft. Additionally, the stowage bin assemblies are configured for relatively low closing force without the need for a complex bin assist mechanism.

A standard sized roller bag may have dimensions of 22"×14"×9", for example. A stowage bin assembly according to an embodiment of the present disclosure may be configured to contain six of such standard sized roller bags in an upright, on-side orientation.

By increasing the amount of baggage that may be stowed in an internal cabin of a vehicle, such as a Boeing 737 aircraft, passenger stress level is reduced, as they may rest assured that there will be room in the overhead stowage bin assemblies for their baggage. Additionally, the increased space for overhead baggage reduces stress and workload of staff at boarding gates, as there will be less need to request that passengers check their bags at the gate. Moreover, the increased overhead baggage space allows for more efficient boarding, as passengers are able to quickly and easily find space for their bags. In comparison to known stowage bins, embodiments of the present disclosure provide stowage bin assemblies that provide large bin cross sections that are able to accommodate an increased number of bags.

Embodiments of the present disclosure provide a stowage bin assembly that may include a closeout bracket, for example. The stowage bin assembly may include a forward end panel, an aft end panel, and a curved front or face panel. A closeout bracket is used to secure the end panels to the front panel. For example, a closeout bracket may be attached to the forward end panel at one end and attached to the aft end panel at an opposite end. The closeout bracket may be a span-wise bracket or connection joint that extends between the forward and aft end panels. The closeout bracket may include a closeout flange having a length such that clearance between a pivot stowbin and a fixed support structure, such as a strongback, is minimized or otherwise reduced. The closeout bracket may be substantially rectangular with honeycomb sandwich panels attached to three of the four sides of the bracket (for example, the pivot bin may not include a top panel). A gap defined by a minimum distance from the flange to the strongback may vary as the pivot bin proceeds through a range of motion. The gap may have a maximum distance between 0.2"-0.3", so as to prevent overhead baggage and personal items from falling therethrough. Alternatively, the gap may have a greater or lesser maximum distance.

Because there is no top to the stowage bin assembly, the assembly may be manufactured such that large panel pieces may be assembled to tight tolerances, and aligned quickly and properly without having separate pieces hanging together by a face sheet. For example, embodiments of the present disclosure provide a method of manufacturing a stowage bin assembly that may include aligning three honeycomb composition panels with a closeout bracket, and attaching the three honeycomb composite panels to the closeout bracket. The aligning operation may include using the closeout bracket as an assembly jig. The attaching operation may include gluing and fastening. At least one of the three composite panels may have a different thickness than the other two.

Embodiments of the present disclosure provide a stowage bin assembly including a pivot bin or bucket having a reduced stiffness. The closeout bracket may stiffen the pivot bin to prevent unwanted deflection. Embodiments of the present disclosure provide a stowage bin assembly that is aesthetically pleasing, lightweight, easy to manufacture, and tamper resistant. Compared to other known stowage bin, embodiments of the present disclosure provide a reliable stowage bin assembly having less parts. Further, the stowage bin assembly is less susceptible to jamming, as the pivot bin is easier to close. Embodiments of the present disclosure provide a stowage bin assembly that has a greater capacity for overhead baggage.

Embodiments of the present disclosure may be configured to pivot between open and closed positions, such as shown and described in U.S. Pat. No. 8,262,022, entitled "Overhead Stowage Bin Load Transfer and Balance System," which is hereby incorporated by reference in its entirety.

FIG. 1 illustrates a perspective top view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
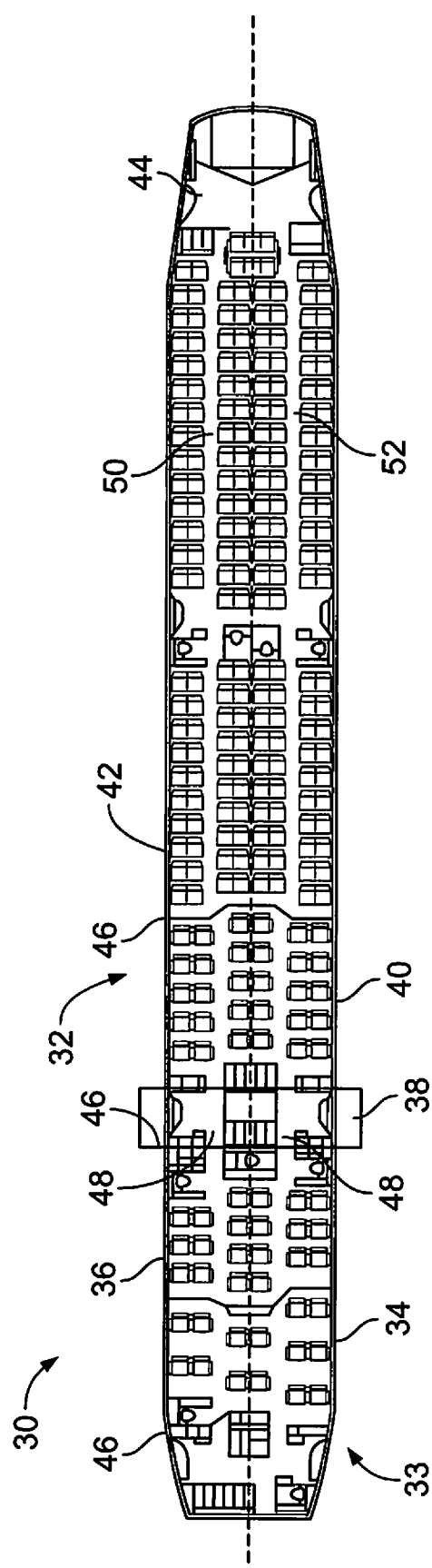
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34, a business class section 36, a front galley station 38, an expanded economy or coach section 40, a standard economy of coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
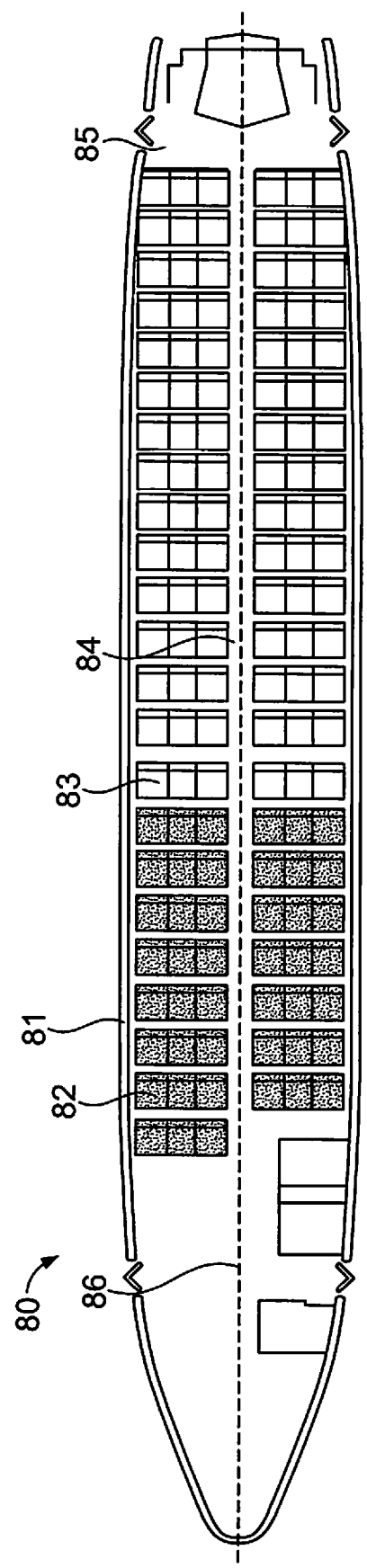
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

FIG. 3 illustrates a perspective interior view of an internal cabin 100 of an aircraft, according to an embodiment of the present disclosure. The internal cabin 100 includes outboard walls 102 connected to a ceiling 104. Windows 106 may be formed within the outboard walls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard wall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

As shown, a gap 124 extends along a length of the internal cabin 100 between the PSUs 114 and the stowage bin assemblies 118 on each side of the aisle 113. The gap 124 allows the pivot bins 120 of the stowage bins 118 to be pivoted between open and closed positions. A closeout panel may be secured to a strongback and extend into the gap 124, as described in U.S. patent application Ser. No. 14/682,197, filed Apr. 9, 2015, entitled "Systems and Methods for Positioning a Section Divider Assembly Within a Vehicle", now U.S. Pat. No. 9,499,271 which is hereby incorporated by reference in its entirety.

Figure 4:
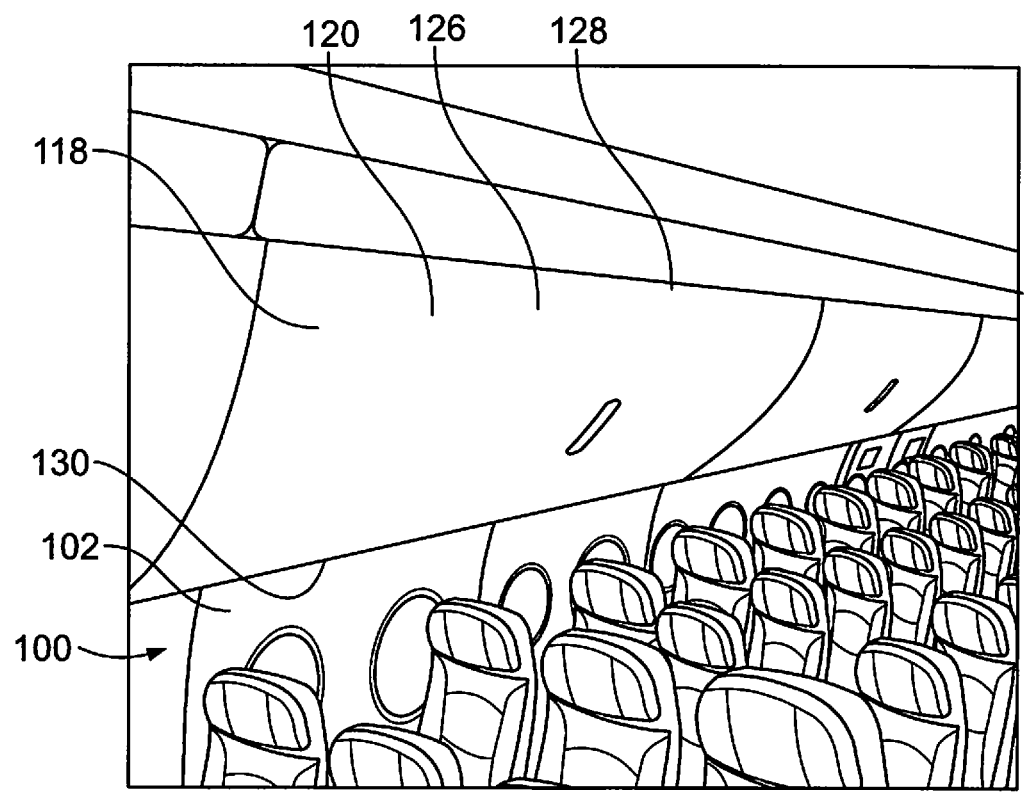
FIG. 4 illustrates a perspective front view of a stowage bin assembly in a closed position within an internal cabin, according to an embodiment of the present disclosure.

FIG. 4 illustrates a perspective front view of a stowage bin assembly 118 in a closed position within the internal cabin 100, according to an embodiment of the present disclosure. The stowage bin assembly 118 includes a pivot bin 120 having a front panel 126 connected to forward and aft end panels (hidden from view in FIG. 4). As shown, the front panel 126 may be an arcuate panel having a curved outer surface that curves downwardly toward the outboard wall 102. As such, a top portion 128 of the front panel 126 is inboard in relation to a lower portion 130.

Figure 5:
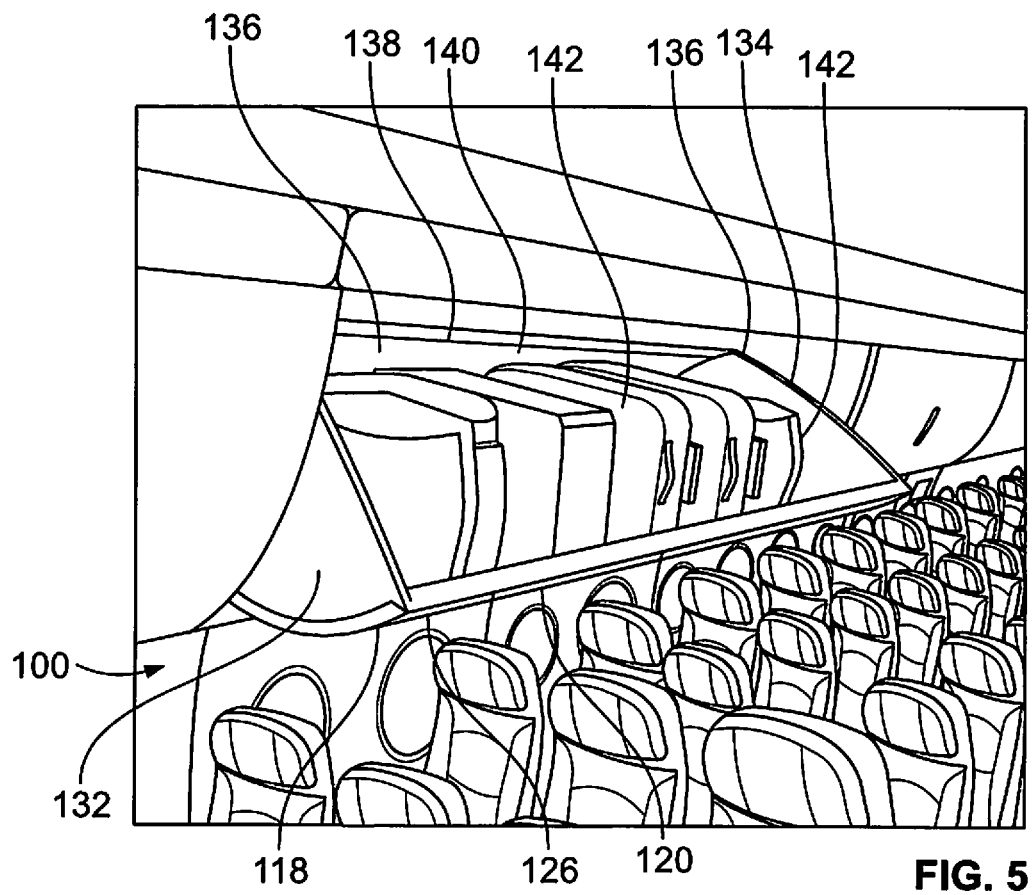
FIG. 5 illustrates a perspective front view of a stowage bin assembly in an open position within an internal cabin, according to an embodiment of the present disclosure.

FIG. 5 illustrates a perspective front view of the stowage bin assembly 118 in an open position within the internal cabin 100, according to an embodiment of the present disclosure. As shown, the front panel 126 is secured to a forward end panel 132 and an aft end panel 134, which may generally be opposed and parallel to one another. The front panel 126 and the end panels 132 and 134 may also connect to a bottom panel 136. The bottom panel 136 may be an inwardly curved portion of the front panel 126, for example. A closeout bracket 138 may span between the end panels 132 and 134 and provide a rigid bracing support therebetween. The front panel 126 may be thicker than the end panels 132 and 134, as the front panel 126 is configured to directly support a weight of overhead bags. As such, the front panel 126 may have increased thickness in order to provide additional support strength and rigidity.

Notably, the pivot bin 120 does not include an upper panel that extends between the end panels 132 and 134. Because there is no upper panel or portion thereof extending between the end panels 132 and 134, an upper volume of the pivot bin 120 is unobstructed and is therefore able to accommodate taller bags, such as roller bags, on their sides.

A baggage retaining chamber 140 is defined between the front panel 126, the end panels 132 and 134, and the bottom panel 136. The baggage retaining chamber 140 is configured to receive baggage when the stowage bin assembly 118 is in the open position. The baggage retaining chamber 140 is configured to accommodate an increased number of bags 142 as compared to other known stowage bins. For example, six or more standard-sized roller bags may be positioned within the baggage retaining chamber 140. Moreover, the baggage retaining chamber 140 is configured to accommodate the bags 142 in a vertical, on-edge orientation, as shown.

Figure 6:
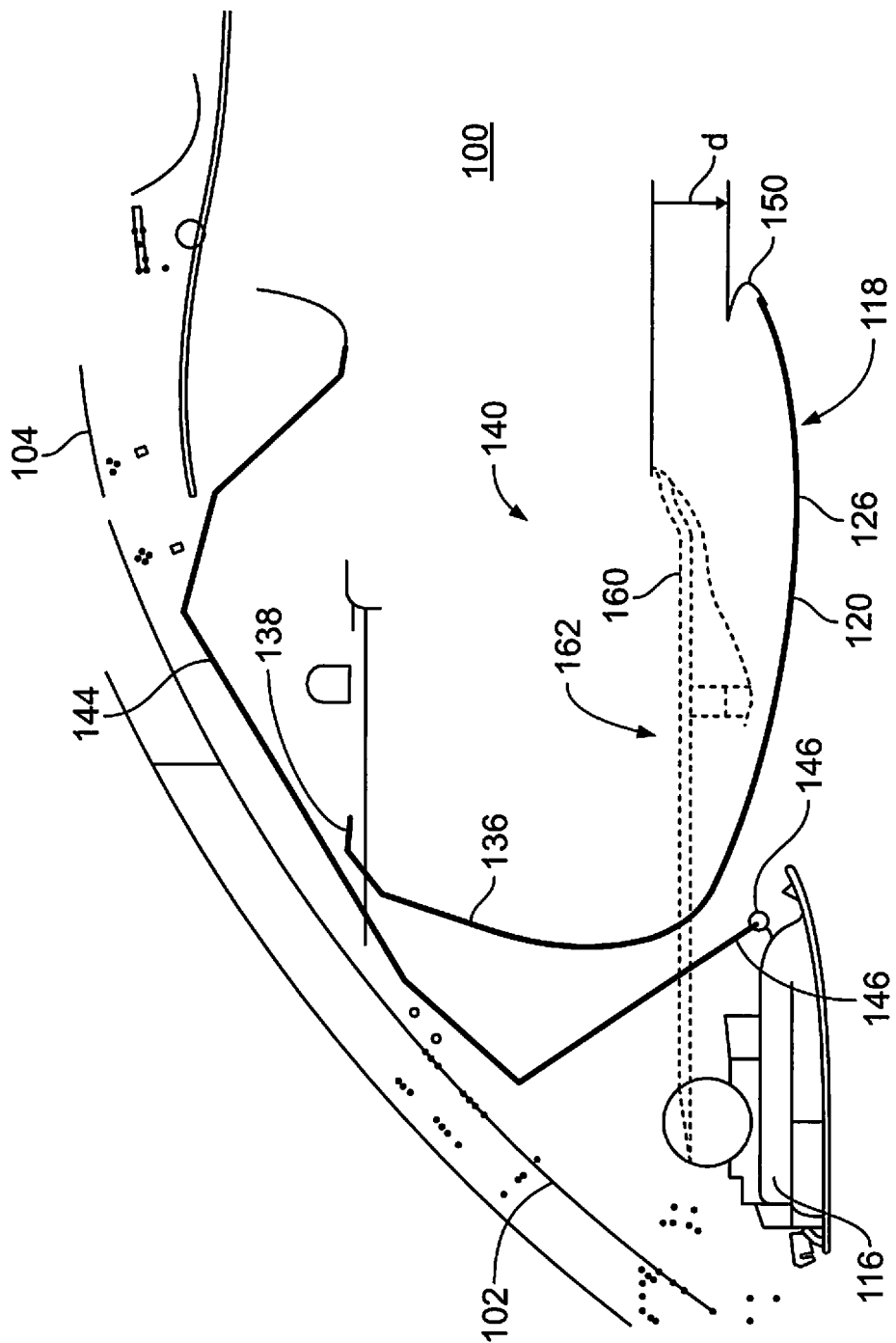
FIG. 6 illustrates a simplified axial cross-sectional view of a stowage bin assembly in an open position within an internal cabin, according to an embodiment of the present disclosure.

FIG. 6 illustrates a simplified axial cross-sectional view of the stowage bin assembly 118 in an open position within the internal cabin 100, according to an embodiment of the present disclosure. The pivot bin 120 may be pivotally secured to a fixed structure, such as a strongback 144, which is secured to the outboard wall 102 and/or the ceiling 104. The PSU 116 may be secured to a lower edge 146 of the strongback 144 through a PSU rail 148.

The pivot bin 120 may not include a top panel or wall. Instead, as shown, the front panel 126 connects to the bottom panel 136, which may connect to the closeout bracket 138. In the open position, an edge or lip 150 of the front panel 126 is at a level that is a distance d lower than a front panel 160 of a previous stowage bin 162. For example, the distance d may be 3". As such, passengers may find it easier to load bags into the baggage retaining chamber 140. The lower level of the lip 150 in the open position provides easier loading of baggage easier, and easier visual inspection by flight attendants.

Figure 7:
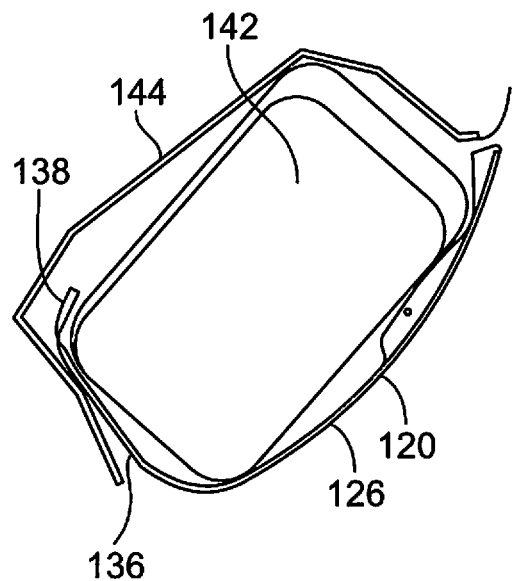
FIG. 7 illustrates a simplified axial cross-sectional view of a stowage bin assembly in a closed position, according to an embodiment of the present disclosure.

FIG. 7 illustrates a simplified axial cross-sectional view of the stowage bin assembly 118 in a closed position, according to an embodiment of the present disclosure. As shown, the baggage retaining chamber 140 is large enough to accommodate bags 142 in a vertical orientation in which they are on oriented in an upright position, supported on a side (in contrast to resting on a front or back). As such, the stowage bin assembly 118 is able to accommodate an increased number of bags 142, as the bags 142 may be positioned on their edges or sides, which allows more room for additional bags to be positioned within the baggage retaining chamber 140.

Figure 8:
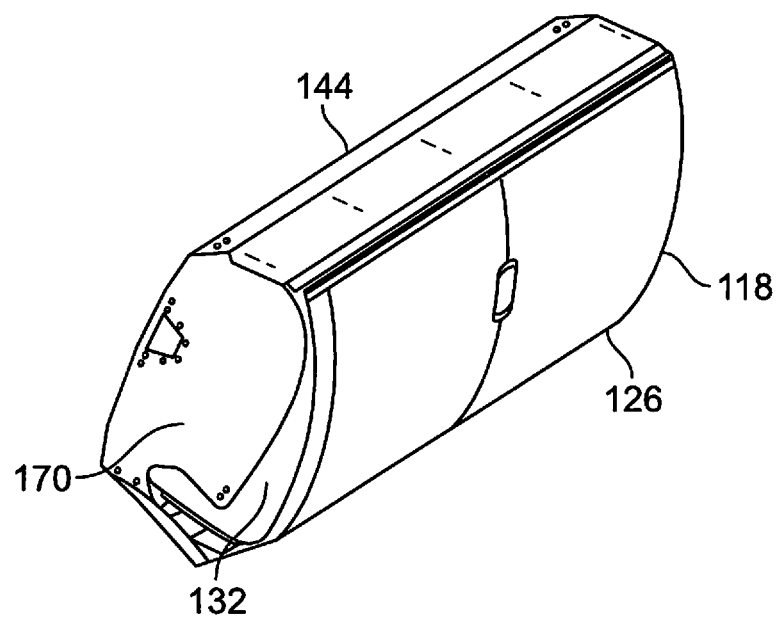
FIG. 8 illustrates a perspective front view of a stowage bin assembly in a closed position, according to an embodiment of the present disclosure.

FIG. 8 illustrates a perspective front view of the stowage bin assembly 118 in the closed position, according to an embodiment of the present disclosure. The front panel 126 is secured to the forward end panel 132 and the aft end panel 134 (hidden from view in FIG. 8). The end panels 132 and 134 may generally be parallel to one another. Each end panel 132 may be pivotally secured to a retaining panel 170 of the strong back 144.

Figure 9:
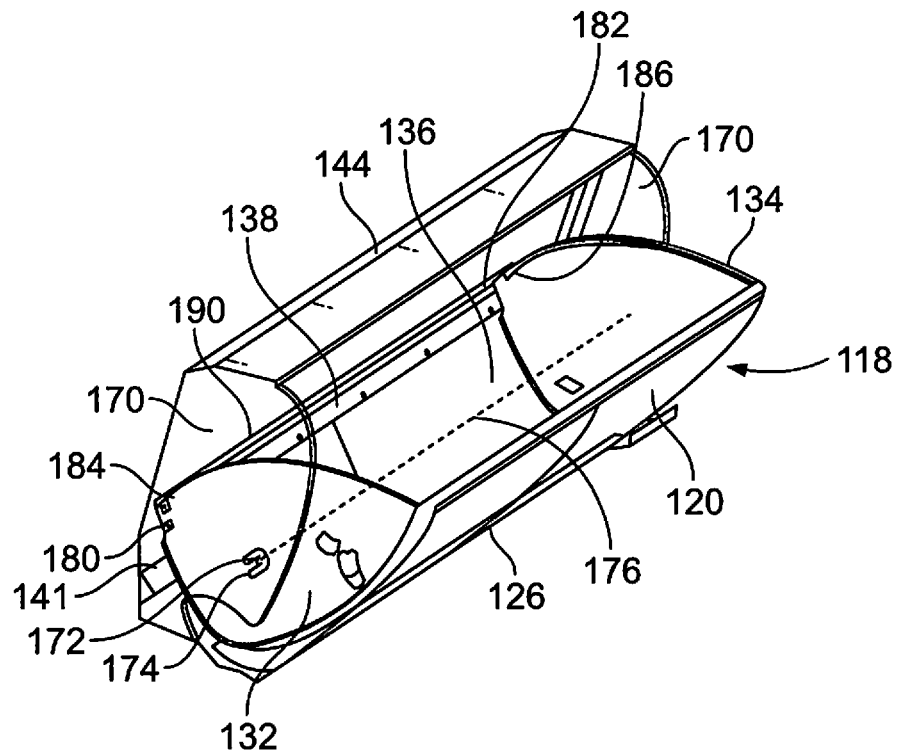
FIG. 9 illustrates a perspective front view of a stowage bin assembly in an open position, according to an embodiment of the present disclosure.

FIG. 9 illustrates a perspective front view of the stowage bin assembly 118 in the open position, according to an embodiment of the present disclosure. The front panel 126 and the end panels 132 and 134 may connect to the bottom panel 136. The closeout bracket 138 may span between the end panels 132 and 134 and provide a rigid bracing support therebetween.

For the sake of clarity, a front retaining panel 170 is shown as transparent. Each of the end panels 132 and 134 may include a pivot pin 172 extending from an outer surface that is pivotally retained within a pivot bearing 174 extending from an internal surface of the retaining panel 170. Alternatively, the pivot bearing may be positioned on the outer surface of an end panel 132 or 134, while the pivot pin 172 extends inwardly from the retaining panel 170. The pivotal engagement of the pivot pins 172 within the pivot bearings 174 defines a pivot axle 176 about which the pivot bin 120 pivots between open and closed positions. Pivotal movement of the stowage bin assembly and the location of the pivot axle 176 may be described in U.S. Pat. No. 8,262,022, for example.

The closeout bracket 138 secures the forward end panel 132 to the aft end panel 134. The closeout bracket 138 may secure to each of the end panels 132, 134 and the front panel 126 (the bottom panel 136 may be a lower curved portion of the front panel 126). A forward end 180 of the closeout bracket 138 may attach to the forward end panel 132 and an aft end 182 of the closeout bracket 138 may attached to the aft end panel 134. As shown, the closeout bracket 138 secures to the end panels 132 and 134 at lower edges 184 and 186. The closeout bracket 138 may extend over edge portions of the end panels 132 and 134 a short distance, such as less than 3".

The closeout bracket 138 spans between the forward and aft end panels 132 and 134, and may include a closeout flange 190 that extends between the forward and aft end panels 132 and 134. The closeout flange 190 may be sized and shaped so that a clearance space between the pivot bin 120 and the strongback 144 is minimized or otherwise reduced in order to prevent items within a baggage retaining chamber from falling therethrough.

The closeout bracket 138 may be substantially rectangular and formed of sheet metal (such as aluminum), thereby providing bracing rigidity to the pivot bin 120. Each of the panels 126, 132, and 134 may be formed of a composite material having a honeycomb structure. A gap defined between the closeout flange 190 and the strongback 144 may vary as the pivot bin 120 proceeds through a range of motion. For example, the gap may have a maximum distance between 0.2"-0.3", to prevent baggage or overhead items from falling therethrough. That is, the gap between the closeout flange 190 and the strongback 144 (throughout a range of motion of the pivot bin 120) may be small enough to prevent baggage, overhead personal items (such as laptop computers), and the like from passing therethrough. At the same time, because the closeout flange 190 is separated from the strongback 144 by the gap, the pivot bin 120 is able to easily move between the open and closed positions. In short, the closeout flange 190 does not interfere with the strongback 144 as the pivot bin 120 pivots between open and closed positions.

The stowage bin assembly 118 may also include a blade seal 191 secured to a lower portion of the strongback 144. The blade seal 191 may be formed of plastic, composite, metal, or the like, and is configured to provide a sealing engagement with the closeout bracket 138 when the pivot bin 120 is in the closed position. In this manner, a closed interface may exist between the blade seal 191 and the closeout bracket 138 that ensures that items remain within the pivot bin 120 in the closed position.

Figure 10:
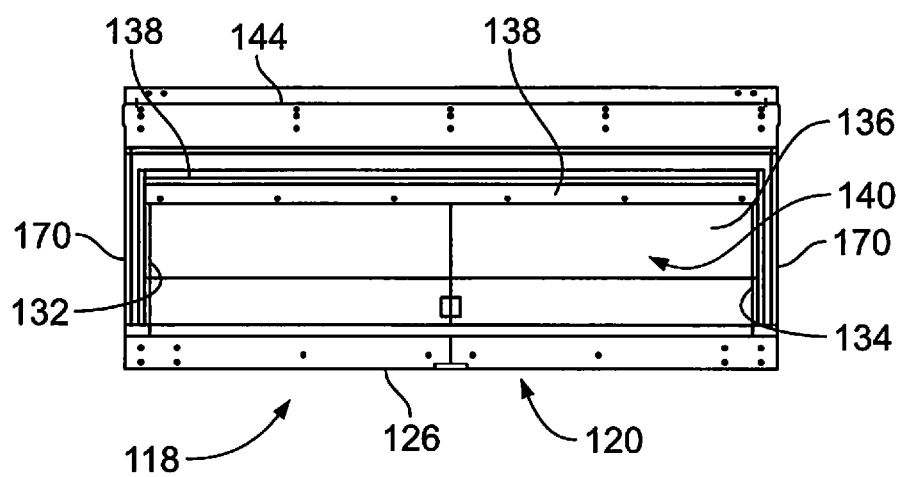
FIG. 10 illustrates a front view of a stowage bin assembly in an open position, according to an embodiment of the present disclosure.

FIG. 10 illustrates a front view of the stowage bin assembly 118 in the open position, according to an embodiment of the present disclosure. As shown, the baggage retaining chamber 140 is formed between the end panels 132, 134, and the front panel 126, which may include the bottom panel 136. The closeout bracket 138 extends and spans between the opposed end panels 132 and 134.

Figure 11:
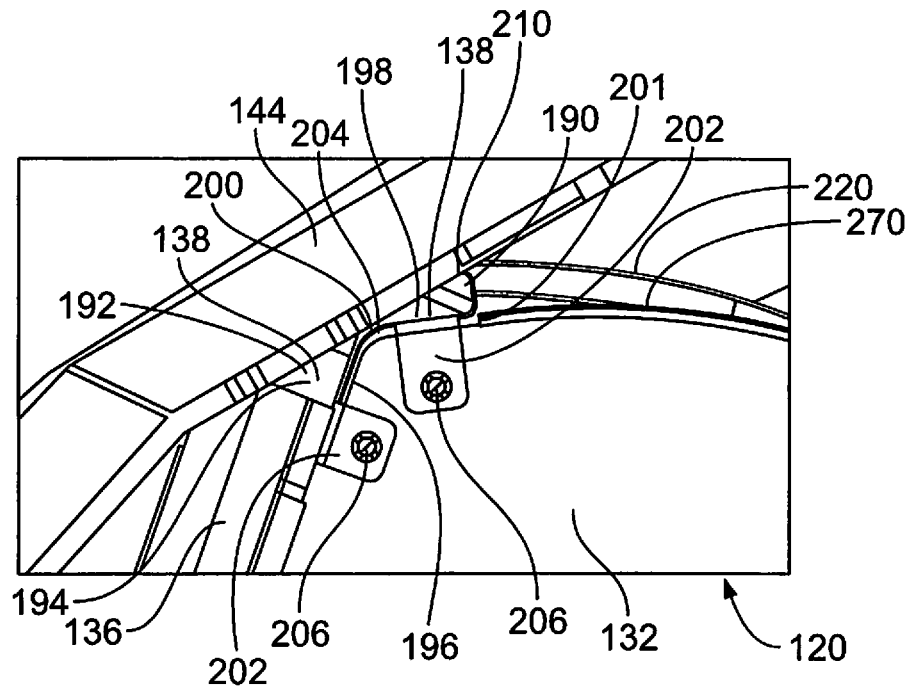
FIG. 11 illustrates a perspective end view of a closeout bracket secured to a forward end panel, according to an embodiment of the present disclosure.
Figure 12:
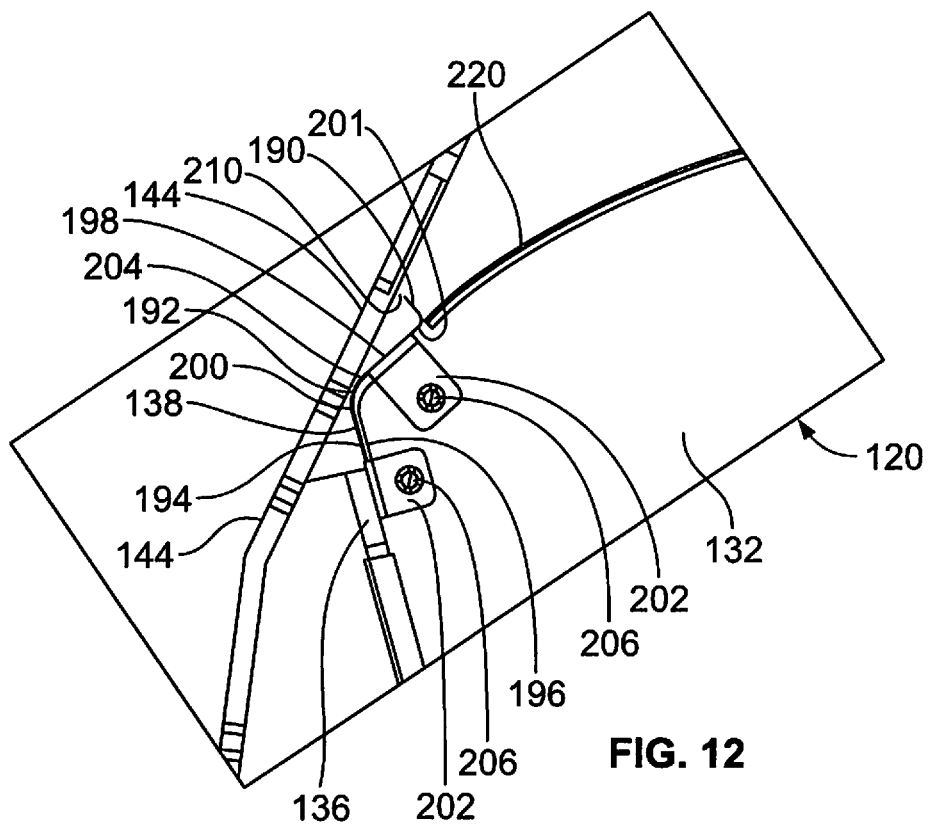
FIG. 12 illustrates an end view of a closeout bracket secured to a forward end panel, according to an embodiment of the present disclosure.

FIG. 11 illustrates a perspective end view of the closeout bracket 138 secured to the forward end panel 132, according to an embodiment of the present disclosure. FIG. 12 illustrates an end view of the closeout bracket 138 secured to the forward end panel 132. Referring to FIGS. 11 and 12, it is to be understood that the closeout bracket 138 may be secured to the aft end panel 134 (not shown in FIGS. 11 and 12) in a similar fashion. As shown in FIGS. 11 and 12, the pivot bin 120 is in an open position with respect to the strongback 144.

The closeout bracket 138 includes a longitudinal main body 192 that spans between the end panels 132 and 134. The main body 192 includes a first portion, such as a ledge 194 that connects to the bottom panel 136 and overlays bottom edge portions 196 of the end panels 132 and 134. The first portion 194 connects to a second portion, such as an upper rail 198 through a curved intermediate transition portion 200 that conforms to an outer edge portion of a portion of the end panels 132 and 134. The second portion 198 overlays lower upstanding edge portions 201 of the end panels 132 and 134. As such, distal, lower curved corner portions of the end panels 132 and 134 are cradled within the main body 192 of the closeout bracket 138.

Securing tabs 202 may extend perpendicularly from distal edges 204 of the main body 192 on either end. The securing tabs 202 are configured to overlay an outer lateral surface portion of the end panel 132, for example, As shown, one securing tab 202 may be proximate to the bottom panel 136 while the other securing tab 202 may be above the bottom panel 136. More or less securing tabs 202 than shown may be used. Each securing tab 202 includes a fastener throughhole that is configured to receive a fastener 206, such as a screw, that is used to securely fasten the closeout bracket 138 to the pivot bin 120.

The closeout flange 190 may be an upturned portion of the second portion 198. For example, the closeout flange 190 may be outwardly bent from the second portion 198 at a 90 degree angle. Alternatively, the angle may be greater or lesser than 90 degrees. The closeout flange 190 has a depth (extending from the second portion 198 to the strongback 144) such that a gap 210 is formed between the closeout flange 190 and an interior surface of the strongback 144. The gap 210 ensures that the closeout flange 190 does not abut into a surface of the strongback 144 throughout a range of motion of the pivot bin 120. The size of the gap 210 may vary at different pivotal locations of the pivot bin 120 with respect to the strongback 144. The maximum distance of the gap 210 throughout a range of motion of the pivot bin 120 may be less than 1", in order to prevent items from falling between the pivot bin 120 and the strongback 144, but at the same time prevent the closeout flange 190 from scraping the interior surface of the strongback 144 (so as to allow free and easy movement of the pivot bin 120 between open and closed positions). In at least one embodiment, the gap 210 may have a maximum distance between 0.2" and 0.3".

The closeout bracket 138 may be secured to a terminal end of the bottom panel 136, which may be an extended portion of the front panel 126. No panel portion may extend beyond the closeout bracket 138 between the end panels 132 and 134. The bottom panel 136 may not extend over lateral edges 220 of the end panels 132 and 134. Indeed, the pivot bin 120 may be devoid of a separate and distinct panel or portion of another panel that secures over the lateral edges 220 of the end panel 132 and 134. Instead, the closeout bracket 138 extends between the end panels 132 and 134. The closeout bracket 138 may extend over a short distance of the lateral edges 220. For example, closeout bracket 138 may extend over less than 2" of the lateral edges 220. In this manner, the pivot bin 120 is able to provide a baggage retaining chamber 140 having an increased volume and height, as there is no closing panel or wall portion that closes off lateral edges 220 of the end panel 132 and 134. Instead of having a separate and distinct composite, honeycomb panel that wraps around the lateral edges 220, the closeout bracket 138 extends between distal, lower corner portions of the end panels 132 and 134, and provides bracing support therebetween. The upturned closeout flange 190 prevents stored overhead items from falling between the pivot bin 120 and the strongback 144.

Figure 13:
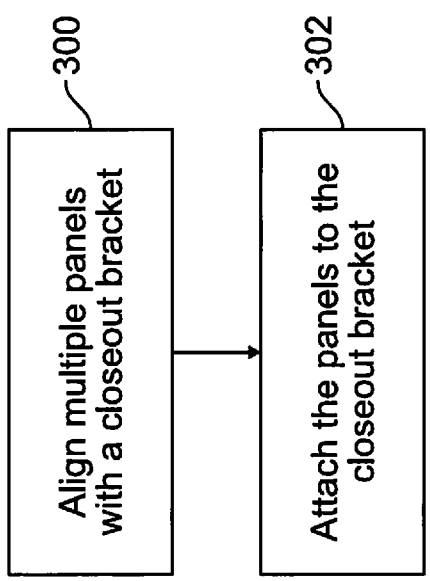
FIG. 13 illustrates a flow chart of a method of a forming a stowage bin assembly, according to an embodiment of the present disclosure.

FIG. 13 illustrates a flow chart of a method of a forming a stowage bin assembly, according to an embodiment of the present disclosure. The method begins at 300, in which multiple panels, such as composite panels, are aligned with a closeout bracket, which may be formed of a metal, such as aluminum. The panels may not include an upper panel that extends over any portion of a baggage retaining chamber.

The closeout bracket may provide an assembly jig or other such alignment structure. For example, the closeout bracket may include portions that cradle portions of a front panel and end panels in position. The closeout bracket may include ridges, recesses, channels, or the like that receive and retain portions of the panels so that they are secured in position.

After being aligned in position by the closeout bracket, the panels are securely attached at the closeout bracket at 302. For example, the panels may be secured to the closeout bracket through fasteners, adhesives, and/or the like. At least one of the panels may have a different thickness than the others. For example, a front panel may be thicker than the end panels, as the front panel is configured to directly support a weight of baggage within the baggage retaining chamber.

In contrast to known stowage bins, embodiments of the present disclosure eliminate a need for a bat wing design and construction. Embodiments of the present disclosure reduce manufacturing complexity. For example, previous stowage bins were formed through a flat bat wing shaped panel (with composite end panels and a cover cut from a single piece of composite material). The single large panel is difficult to handle and may easily be damaged (such as through tearing) at edges where it is folded. The large panel is folded to form the top and sides of the bin, and glued to a bin bucket face. Additional edge molding pieces are then glued into place along the top edge to cover the exposed honeycomb composite edge. In contrast, embodiments of the present disclosure include the end panels that are separately cut into small, easy-to-handle pieces, which may be secured to the front panel, and attached together with the closeout bracket, which may be a sheet metal back joint. None of the portions may be folded (which may form weakened areas) to form any of the panels.

Figure 14:
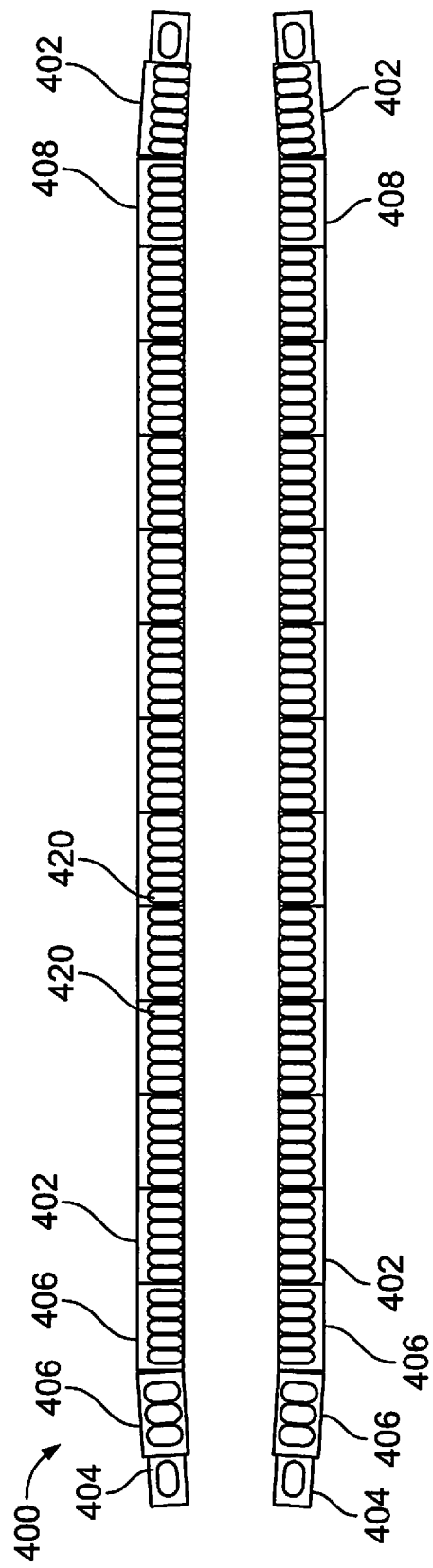
FIG. 14 illustrates a simplified top plan view of an internal cabin having a plurality of stowage bin assemblies, according to an embodiment of the present disclosure.

FIG. 14 illustrates a simplified top plan view of an internal cabin 400 having a plurality of stowage bin assemblies, according to an embodiment of the present disclosure. Referring to FIGS. 1-14, the internal cabin 400 may be that of a Boeing 737 airplane. The internal cabin 400 may include 24 stowage bin assemblies 402, each having a length of 60", two front stowage bin assemblies 404, each having a length of 34", four first class stowage bin assemblies 406, each having a length of 57", two distal stowage bin assemblies 408, each having a length of 53", and two rear stowage bin assemblies, each having a length of 30". Embodiments of the present disclosure provide stowage bin assemblies similar to the stowage bin assemblies 402. Each of the stowage bin assemblies 402 may have a length of 60", and is able to accommodate six standard sized roller bags 420 on their sides. Compared to known stowage bins, the stowage bin assemblies 402 are able to contain 2 extra standard sized roller bags 420. Further, each stowage bin assembly 402 may have an internal baggage retaining chamber volume of 300-450 ft3 (depending on the size of the aircraft), which is more than 60-80 ft3 greater than known stowage bins. In short, the internal cabin 300 includes stowage bin assemblies 402 that have increased volume and are able to contain more bags 420 than known stowage bins. The stowage bin assemblies 402 are configured to contain more bags 420 than known stowage bins, thereby allowing the internal cabin 400 to be able to accommodate substantially more bags 420.

Embodiments of the present disclosure provide stowage bin assemblies that are larger than known stowage bins, offer passengers and crew more room and flexibility for loading bags, and increase opportunity for all passengers to be able to find a suitable overhead stowage space for their bags. Further, each stowage bin assembly may not include a complex bin assist mechanism.

Embodiments of the present disclosure provide a stowage bin assembly having increased bag-containing volume due to the closeout bracket, which may be a sheet metal back joint that spans between end panels. The closeout bracket may include a closeout flange that prevents items from being inadvertently placed on top of the pivot bin, and prevents smaller items from falling behind the pivot bin. Additionally, in the open position, the pivot bin provides greater visibility into the baggage retaining chamber, which allows for quicker and easier inspection by flight attendants. Unlike known stowage bins, embodiments of the present disclosure provide a stowage bin assembly that does not need a fabric closeout between a pivot bin and a strongback.

As described above, embodiments of the present disclosure provide a stowage bin assembly that may be devoid of a fabric closeout. Embodiments of the present disclosure provide a stowage bin assembly having a closeout bracket, which may be formed of metal, that eliminates, minimizes, or otherwise reduce areas where items may be hidden. In short, embodiments of the present disclosure provide stowage bin assemblies that have no spaces or areas to hide items. Accordingly, embodiments of the present disclosure allow for quick and effective safety inspections of overhead stowage bin assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A stowage bin assembly configured to be positioned above at least a portion of one or more seats within a vehicle, the stowage bin assembly comprising:
a pivot bin including:
a forward end panel;
an aft end panel that is opposed to the forward end panel;
a front panel extending between the forward and aft end panels, wherein a baggage retaining chamber is defined between the forward end panel, the aft end panel, and the front panel; and
a closeout bracket that stiffens the pivot bin, wherein the closeout bracket extends along an edge of the front panel between the forward end panel and the aft end panel.

2. The stowage bin assembly of claim 1, further comprising a strongback, wherein the pivot bin is pivotally secured to the strongback, and wherein the pivot bin is configured to be pivoted between open and closed positions.

3. The stowage bin assembly of claim 1, wherein the stowage bin assembly is devoid of an upper panel.

4. The stowage bin assembly of claim 1, wherein the closeout bracket is secured to a bottom end of the front panel.

5. The stowage bin assembly of claim 4, wherein no portion of any panel extends past the closeout bracket between the forward and aft end panel.

6. The stowage bin assembly of claim 1, wherein each of the forward end panel, the aft end panel, and the front panel are formed of composite honeycomb sandwich panels, and wherein the closeout bracket is formed from a unitary piece of metal.

7. The stowage bin assembly of claim 1, wherein the baggage retaining chamber is configured to support standard sized roller bags in a vertically-oriented position in open and closed positions, wherein an interior surface of the front panel is configured to support sides of the standard sized roller bags in the open and closed positions.

8. The stowage bin assembly of claim 1, wherein the closeout bracket comprises a closeout flange that is configured to be spaced apart from a strongback through an entire range of motion of the pivot bin with respect to the strongback.

9. The stowage bin assembly of claim 8, wherein the closeout flange comprises an upturned edge of a longitudinal main body.

10. The stowage bin assembly of claim 8, wherein the closeout bracket comprises a main body having a first portion connected to a second portion through an intermediate curved portion, wherein the main body is configured to cradle lower curved corner portions of the forward and aft end panels.

11. The stowage bin assembly of claim 10, wherein the closeout bracket further comprises one or more securing tabs extending perpendicularly from one or both of the first and second portions, wherein each of the one or more securing tabs comprises a through-hole configured to receive a fastener that secures the closeout bracket to one or more of the front panel, the forward end panel, or the aft end panel.

12. A method of forming a pivot bin of a stowage bin assembly that is configured to be positioned above at least a portion of one or more seats within a vehicle, the method comprising:
forming a forward end panel, an aft end panel, and a front panel;
aligning the forward end panel, the aft end panel, and the front panel with respect to a closeout bracket; and
attaching the closeout bracket along an edge of the front panel between the forward end panel and the aft end panel.

13. The method of claim 12, wherein the aligning operation comprises using the closeout bracket as an assembly jig for the forward end panel, the aft end panel, and the front panel.

14. The method of claim 12, wherein the attaching operation comprises one or both of adhesively securing the forward end panel, the aft end panel, and the front panel to the closeout bracket or using one or more fasteners to secure the forward end panel, the aft end panel, and the front panel to the closeout bracket.

15. The method of claim 12, further comprising upturning an edge of the closeout bracket to form a closeout flange.

16. The method of claim 12, further comprising refraining from securing an upper panel to any of the forward end panel, the aft end panel, and the front panel.

17. The method of claim 12, further comprising refraining from folding any panel portions to form any of the forward end panel, the aft end panel, and the front panel.

18. The method of claim 12, wherein the forming operation comprises forming the front panel with a different thickness than the forward and aft end panels.

19. A stowage bin assembly configured to be positioned above at least a portion of one or more seats within a vehicle, the stowage bin assembly comprising:
a pivot bin including a closeout bracket that stiffens the pivot bin, wherein the closeout bracket extends along an edge of a front panel between a forward end panel and an aft end panel.

20. The stowage bin assembly of claim 19, wherein a baggage retaining chamber is defined between the forward end panel, the aft end panel, and the front panel, wherein the baggage retaining chamber is configured to support standard sized roller bags in a vertically-oriented position in open and closed positions, wherein an interior surface of the front panel is configured to support sides of the standard sized roller bags in the open and closed positions.

* * * * *